United States Patent
Gorges et al.

(10) Patent No.: US 10,190,631 B2
(45) Date of Patent: Jan. 29, 2019

(54) SLIDING ENGINE COMPONENT

(71) Applicants: Mahle International GmbH, Stuttgart (DE); Mahle Engine Systems UK Ltd, Warwickshire (GB)

(72) Inventors: Roger Gorges, Birmingham (GB); James P. De Blaquiere, Derby (GB)

(73) Assignees: Mahle International GmbH (DE); Mahle Engine Systems UK Ltd (GB)

( * ) Notice: Subject to any disclaimer, the term of this patent is extended or adjusted under 35 U.S.C. 154(b) by 331 days.

(21) Appl. No.: 14/912,915

(22) PCT Filed: Aug. 18, 2014

(86) PCT No.: PCT/EP2014/067553
§ 371 (c)(1),
(2) Date: Feb. 18, 2016

(87) PCT Pub. No.: WO2015/024897
PCT Pub. Date: Feb. 26, 2015

(65) Prior Publication Data
US 2016/0201719 A1    Jul. 14, 2016

(30) Foreign Application Priority Data
Aug. 19, 2013 (GB) .................. 1314816.8

(51) Int. Cl.
| | |
|---|---|
| F16C 33/20 | (2006.01) |
| F16C 17/12 | (2006.01) |
| G01K 11/12 | (2006.01) |
| B05D 5/06 | (2006.01) |
| B05D 7/14 | (2006.01) |
| G01K 11/14 | (2006.01) |
| G01K 11/16 | (2006.01) |
| F16C 41/00 | (2006.01) |
| F16C 17/02 | (2006.01) |
| F16C 17/24 | (2006.01) |

(52) U.S. Cl.
CPC .............. *F16C 33/201* (2013.01); *B05D 5/06* (2013.01); *B05D 7/14* (2013.01); *F16C 17/022* (2013.01); *F16C 33/205* (2013.01); *F16C 33/206* (2013.01); *F16C 33/208* (2013.01); *F16C 41/008* (2013.01); *G01K 11/12* (2013.01); *G01K 11/14* (2013.01); *G01K 11/16* (2013.01); *F16C 17/02* (2013.01); *F16C 17/243* (2013.01); *F16C 2208/20* (2013.01)

(58) Field of Classification Search
None
See application file for complete search history.

(56) References Cited

U.S. PATENT DOCUMENTS

| | | |
|---|---|---|
| 2,246,086 A | 6/1941 | Austin |
| 4,208,472 A | 6/1980 | Cho et al. |
| 4,925,727 A * | 5/1990 | Brown .................... B41M 5/284 116/216 |
| 2007/0152199 A1* | 7/2007 | Seeboth ................... C09K 9/02 252/583 |
| 2007/0297704 A1* | 12/2007 | Mayston ............... F16C 33/201 384/276 |
| 2008/0063026 A1 | 3/2008 | Roche |
| 2009/0257694 A1* | 10/2009 | Hunter ................. C10M 119/02 384/286 |
| 2011/0216994 A1 | 11/2011 | Grunau et al. |
| 2011/0317955 A1 | 12/2011 | Mayston et al. |

FOREIGN PATENT DOCUMENTS

| | | | |
|---|---|---|---|
| CN | 101095989 A | 1/2008 | |
| CN | 102124239 A | 7/2011 | |
| CN | 102272470 A | 12/2011 | |
| GB | 1604990 A | 12/1981 | |
| JP | 2004-238545 A * | 8/2004 | ............ C08L 101/00 |

OTHER PUBLICATIONS

Machine translation of JP 2004-238545 A (no date).*
English abstract for JP2006009837.
Chinese Office Action dated Nov. 16, 2017 relating to corresponding Chinese Patent Application No. 2017111301754450.
Chinese Office Action related to corresponding Chinese Patent Application No. 201480040759.0 dated Jun. 8, 2017.

* cited by examiner

*Primary Examiner* — Michael J Feely
(74) *Attorney, Agent, or Firm* — Fishman Stewart PLLC (57) ABSTRACT

A sliding engine component may include a sliding surface, and the sliding surface may include a plastic polymer-based layer disposed on a metallic substrate. The plastic polymer-based layer may have a composition including a plastic polymer-based material having distributed throughout the polymer-based material a thermochromic material configured to change color irreversibly when thermally activated by heating beyond a threshold thermal treatment condition. The polymer-based material may be cured.

23 Claims, 3 Drawing Sheets

SLIDING ENGINE COMPONENT

CROSS-REFERENCE TO RELATED APPLICATIONS

This application claims priority to Great Britain Patent Application No. 1314816.8, filed Aug. 19, 2013, and International Patent Application No. PCT/EP2014/067553, filed Aug. 18, 2014, both of which are hereby incorporated by reference in their entirety.

TECHNICAL FIELD

The present invention relates to sliding engine components having a plastic polymer-based bearing "overlay" layer, and in particular to sliding engine components for sliding bearing assemblies such as bearing lining shells, bushes, bearing surfaces of crankshafts, bearing surfaces of camshafts, bearing surfaces of connecting rods, thrust washers, bearing surfaces of a bearing block, bearing surfaces of a bearing cap, and piston assembly components such as piston rings, piston skirts, and cylinder walls and cylinder liners.

BACKGROUND

In internal combustion engines, the bearing assemblies typically each comprise a pair of half bearings retaining a crankshaft that is rotatable about an axis. Each half bearing is a hollow generally semi-cylindrical bearing shell, and typically at least one is a flange half bearing, in which the bearing shell is provided with a generally semi-annular thrust washer extending outwardly (radially) at each axial end. In other bearing assemblies it is also known to use an annular or circular thrust washer.

The bearing surfaces of sliding bearings generally have a layered construction, in which a strong backing material is coated with one or more layers having preferred tribological properties, which provide the bearing surface that faces the cooperating moving part, in use. In known half bearings and thrust washers: the strong backing material may be steel, having a thickness of about 1 mm or more; the bearings surface is coated with a layer (the "overlay layer") of 6 to 25 µm of a plastic polymer-based composite layer; and optionally at least one intervening layer (a "lining layer") may be provided between the backing and the overlay layer, such as a copper-based material (e.g. copper-tin bronze) or an aluminium-based material (e.g. aluminium-tin alloy), adhered to the backing, and the thickness of the optional lining layer is generally in the range from about 0.1 to 0.5 mm (e.g. 300 am of copper-based alloy of 8% wt Sn, 1% wt Ni, and balance of Cu, apart from incidentally impurities).

For example, WO2010066396 describes a plastic polymer-based composite material for use as an overlay layer on a steel backing, which comprises a matrix of a polyamide/imide plastic polymer material, having distributed throughout the matrix: from 5 to less than 15% vol of a metal powder; from 1 to 15% vol of a fluoropolymer particulate, the balance being the polyamide/imide resin apart from incidental impurities (e.g. a layer of 12 am thickness that comprises 12.5% vol Al, 5.7% vol PTFE particulate, 4.8% vol silane, <0.1% vol other components, and balance (approximately 77% vol) polyamide/imide).

Such plastic polymer-based overlay layers may be deposited by various different methods, including spraying, pad printing (an indirect offset printing process, e.g. in which a silicone pad transfers a patterned layer of the plastic polymer composite material onto the sliding bearing substrate), screen printing, or by a transfer rolling process. Prior to deposition, the plastic polymer is in solution in a solvent, and the solid particulate is suspended in the solution. The composite overlay layer may be built up as a succession of sub-layers, in which repeated depositions of thin coatings are interspersed with flash-off phases to remove the solvent. After the deposition has been completed, the deposited polymer is thermally cured by prolonged heating to set the polymer by inducing cross-linking, e.g. at 140 to 240° C. for a duration that may range from a few minutes to a few hours (e.g. 10 minutes to 2 hours).

The polymer may be cured at different temperatures, when deposited on different substrates. For example: for polymer deposited directly onto a steel backing without a lining layer, or where a bronze lining layer is provided on the backing, the substrate is able to withstand high temperature curing of the polymer; in contrast, where an aluminium-tin lining layer is used on the backing, lower temperature curing is used, to avoid migration of the tin to crystal boundaries, weakening the lining layer. The polymer layer typically obscures the backing or any lining layer, and does not significantly change in appearance when cured, or differ in appearance when cured under different conditions. Accordingly, to distinguish between differently cured bearings formed with the same uncured plastic polymer-based layer, it is necessary to refer to the documentation on which the curing regime has recorded.

SUMMARY

According to a first aspect, there is provide a sliding engine component having a sliding surface provided by a plastic polymer-based layer on a metallic substrate obtainable by the process of coating the metallic substrate with a plastic polymer-based material having distributed throughout the polymer-based material a thermochromic material configured to change colour irreversibly when thermally treated by heating beyond a threshold thermal treatment condition; and curing the polymer-based material.

According to a second aspect there is a sliding engine component having a plastic polymer-based layer on a metallic substrate, the polymer-based layer comprising: a plastic polymer-based material having distributed throughout the polymer-based material a thermochromic material that has been thermally treated by heating above a threshold thermal treatment condition of the thermochromic material to irreversibly induce a colour change.

According to a third aspect there is an engine comprising a sliding engine component according to the first or second aspect.

According to a fourth aspect there is provided use of a thermochromic material as an indicator of thermal treatment of a sliding engine component having a plastic polymer-based layer on a metallic substrate, the polymer-based layer comprising: a plastic polymer-based material having distributed throughout the polymer-based material a thermochromic material configured to change colour irreversibly when thermally treated by heating above a threshold thermal treatment condition.

According to a fifth aspect there is a method of manufacturing a sliding engine component having a sliding surface provided by a plastic polymer-based layer on a metallic substrate, the plastic polymer-based layer comprising: a plastic polymer-based material having distributed throughout the polymer-based material a thermochromic material that changes colour irreversibly when thermally treated by heating beyond a threshold thermal treatment condition; the method comprising: coating the plastic polymer-based layer onto the substrate; and curing the plastic polymer-based layer.

The polymer-based material may be cured below the threshold thermal treatment condition of the thermochromic material.

The polymer-based material may be cured by a process selected from the group consisting of: heating in an oven, infrared radiation, and ultraviolet light. The polymer-based material may be thermally cured above the threshold thermal treatment condition of the thermochromic material.

The sliding engine component may have distributed throughout the polymer-based material a plurality of thermochromic materials each configured to change colour irreversibly when thermally treated by heating above respective, different threshold thermal treatment conditions.

The polymer-based material may be thermally cured above the threshold thermal treatment conditions of two thermochromic materials.

The proportion of thermochromic material may be 5 to 20% vol.

The sliding engine component may have distributed throughout the polymer-based material a non-thermochromic pigmented material that enhances the visual contrast of the coating when the thermochromic material changes colour.

The concentration of thermochromic material may be greatest at the surface of the plastic polymer-based layer remote from the substrate.

The sliding engine component may comprise a further plastic polymer-based layer that does not comprise a thermochromic material, which is provided between the substrate and the plastic polymer-based layer that comprises the thermochromic material.

The thermochromic material may be selected from the group consisting of thermochromic materials having: a colour change based on a change in the crystalline phase; a colour change based on a change in ligand geometry; and a colour change based on a change in number of molecules of solvent in the coordination sphere or to a decomposition.

The thermochromic material may comprise a thermochromic powdered solid distributed through the polymer-based material.

The thermochromic material may comprise a thermochromic solute that is dissolved in the polymer-based material.

The thermochromic material may be selected from the group consisting of: inorganic metal salts, organic encapsulated inorganic material, acrylic polymer, and leuco dyes.

The thermochromic material may be selected from the group consisting of:
$Co(NO_2)_2$—$2C_5H_{12}N_4 \cdot 10H_2O$,
$[Co(NH_3)_5Cl]C_{12}$,
$[Co(NH_3)Cl]SiF_6$,
$[Co(NH_3)_6]PO_4$,
$NiSO_4 \cdot 7H_2O$,
$NiCl_2 \cdot 2C_6H_{12}N_4 \cdot 10H_2O$,
$NiBr_2 \cdot 2C_5H_{12}N_4 \cdot 10H_2O$,
$Ni(CNS)_2$-pyridine
$Ni(MoO_4)_6 \cdot 8H_2O$,
$Cu(OH)_2$,
$2Cu(CNS)_2 \cdot 2$pyridine,
$[Cr(NH_3)_6]_4(P_3O_7)_8$,
$(NH_4)_2Cr_2O_7$,
$Cd(OH)_2$,
$NH_4VO_3$,
$(NH_4)_2U_2O_7$, and
$NH_4CoPO_4$.

The thermochromic material may be selected from the group of leuco dyes consisting of: spirolactones, spiropyrans, and fulgides.

The spirolactone may be crystal violet lactone.

The fluorane may be selected from the group consisting of:
3,3'-dimethoxy-fluorane,
3-chloro-6-phenylamino-flourane,
3-diethylamino-6-methyl-7-chlorofluorane,
3-diethyl-7,8-benzofluorane,
3,3',3"-tris(p-di-methylaminophenyl)phthalide,
3,3'-bis(p-dimethyl-aminophenyl)-7-phenylaminofluorane, and
3-diethyl-amino-6-methyl-7-phenylamino-fluorane.

The threshold thermal treatment condition of the thermochromic material may comprise a threshold curing temperature in the range 150 to 320° C.

The sliding engine component may be a sliding bearing assembly component selected from the group consisting of bearing lining shells, bushes, bearing surfaces of crankshafts, bearing surfaces of camshafts, bearing surfaces of connecting rods, thrust washers, bearing surfaces of a bearing block, and bearing surfaces of a bearing cap.

The plastic polymer-based layer may comprise a plurality of thermochromic materials and at least one thermochromic material may have been thermally treated by heating above a threshold thermal treatment condition.

The curing may comprise thermally curing the plastic polymer-based layer beyond the threshold thermal treatment condition.

The method may further comprise analysing the sliding engine component to identify whether a colour change indicative of thermal curing beyond the threshold thermal treatment condition has occurred.

BRIEF DESCRIPTION OF THE DRAWINGS

Embodiments of the invention are further described hereinafter with reference to the accompanying drawings, in which.

DETAILED DESCRIPTION

In the described embodiments, like features have been identified with like numerals, albeit in some cases having one or more of: increments of integer multiples of 100; and typographical marks (e.g. primes). For example, in different figures, 100, 100', 200, 200", 300 and 400 have been used to indicate a bearing shell.

Figure 1A:
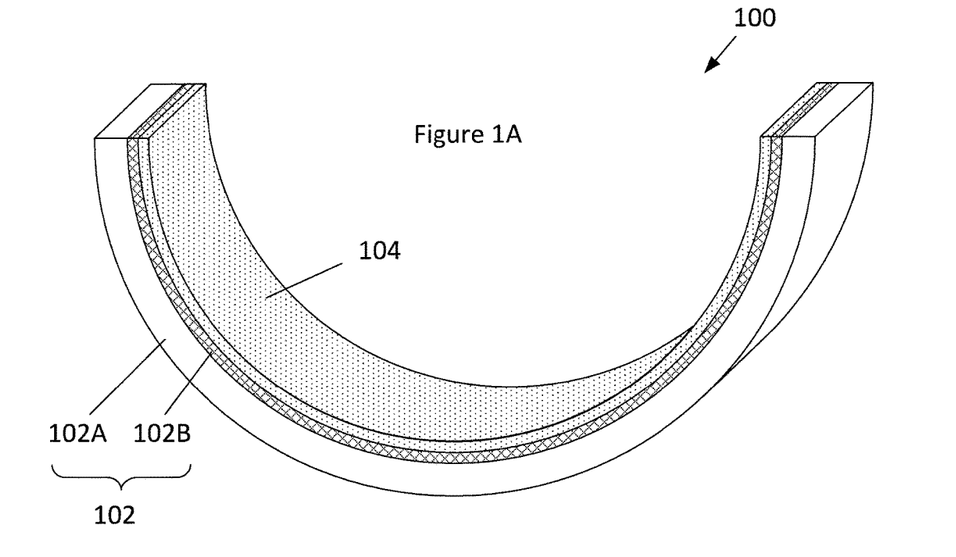
FIG. 1A shows a bearing shell.

FIG. 1A schematically illustrates a sliding bearing 100 (e.g. a sliding engine component) in the form of a hollow semi-cylindrical bearing lining shell (commonly referred to as a "half bearing").

The half bearing 100 has a substrate 102 comprising a strong steel backing 102A and an optional bearing lining layer 102B (e.g. an aluminium-tin alloy layer) on the concave inner surface of the backing. A plastic polymer-based "overlay" layer 104 is provided on the substrate 102. The overlay layer 104 is configured to provide a running surface over the lifetime of the sliding bearing 100. The overlay layer 104 is the innermost layer of the half bearing, which is configured to face a cooperating moving part in a bearing assembly (e.g. the overlay layer receives a journaled shaft in an assembled bearing, which mutually cooperate, with an intervening film of lubricating oil).

The plastic polymer-based overlay layer 104 is a composite layer of a plastic polymer matrix with particulate distributed throughout the matrix. The plastic polymer material is selected from the group consisting of: polyamide/imide resin, acrylate resin, epoxy resin, polyurethane, fluoropolymer, polyetheretherketone, formaldehyde resin, and phenolic resin. The layer comprises a thermochromic material that changes colour irreversibly when thermally treated beyond a threshold thermal treatment condition, which is necessary to induce the associated thermochromic chemical reaction. The thermochromic material may be distributed throughout the polymer matrix as a solid powder, or may be dissolved as a solute in the polymer matrix (which may facilitate uniformity of dispersion).

The plastic polymer-based overlay layer 104 comprises 5 to 20% vol thermochromic material, and preferably 10 to 15% vol. Less than 5% vol of the (or each) thermochromic material may produce a colour change that is difficult to distinguish. Above 20% vol of thermochromic material (or total proportion, in the case of a plurality of thermochromic materials) may compromise the structural integrity of the polymer.

The threshold thermal treatment condition require to induce the thermochromic chemical reaction is a function of both curing temperature (to provide the chemical activation energy) and duration (to enable the kinetics to take place), with the required curing duration decreasing with increasing curing temperature. For example, a threshold thermal treatment condition may require a curing duration of 120 minutes at 227° C., but just 1 minute at 313° C. Thermochromic materials having a curing temperature in the range 150 to 320° C., may be particularly suitable for use with the types of polymers used in sliding engine components (e.g. half bearings) and their typical operating temperatures.

The thermochromic material may be an inorganic metal salt, organic encapsulated inorganic material, acrylic polymer, or a leuco dye. In the case of an inorganic salt, the thermochromic material may be inorganic metal salts such as some salts or complexes of transition metals (e.g. cobalt, nickel, copper, chromium, cadmium, vanadium, zinc, iron), and uranium, bismuth and aluminium. For example, the thermochromic material may be $Co(NO_2)_2$—$2C_5H_{12}N_4.10H_2O$, $[Co(NH_3)_5Cl]C_{12}$, $[Co(NH_3)Cl]SiF_6$, $[Co(NH_3)_6]PO_4$, $NiSO_4-7H_2O$, $NiCl_2-2C_6H_{12}N_4-10H_2O$, $NiBr_2-2C_5H_{12}N_4-10H_2O$, $Ni(CNS)_2$-pyridine $Ni(MoO_4)_6-8H_2O$, $Cu(OH)_2$, $2Cu(CNS)_2$-2pyridine, $[Cr(NH_3)_6]_4(P_3O_7)_8$, $(NH_4)_2Cr_2O_7$, $Cd(OH)_2$, $NH_4VO_3$, $(NH_4)_2U_2O_7$, and/or $NH_4CoPO_4$, which all have a thermochromic threshold thermal treatment condition with a threshold temperature in the range 150 to 235° C. In the case of an organic encapsulated inorganic material, for example, the thermochromic material may comprise a melamine-formaldehyde polymer shell containing a thermochromic inorganic metal salt. In the case of a leuco dye, the thermochromic material may be a spirolactone, a spiropyran or a fulgides. The spriolactone may be crystal violet lactone.

The plastic polymer-based overlay layer 104 may also comprise 5 to 20% vol non-thermochromic pigmented material, and preferably 10 to 15% vol. The non-thermochromic pigmented material may provide a combined visual effect with the thermochromic material to enhance the visual contrast before and after the polymer-based layer has been cured beyond the threshold thermal treatment condition of the thermochromic material.

The composite overlay layer is deposited as a mixture of a plastic polymer-based matrix material and suspended material, and may further comprise solvent, which may facilitate forming the mixture. Suitable solvents may be non-polar (e.g. xylene, toluene), polar aprotic (e.g. acetone, n-ethyl-2-pyrrolidone {NEP}, n-methyl-2-pyrrolidone {NMP}, gamma-butyrolactone, dipropylene glycol dimethyl ether) or polar protic (e.g. water, alcohol, glycol). The solvent can be employed in various proportions in order to achieve a particular desired viscosity of mixture for coating onto the substrate.

The plastic polymer mixture may also contain an addition of a silane material. Silane materials have been found to promote stability of the polyamide/imide matrix and have also been found to promote adhesion of the polyamide/imide resin material to the substrate. A suitable silane material may be gamma-aminopropyltriethoxysilane (e.g. 3-aminopropyltriethoxysilane), and an addition in the range of 3 to 6% vol may be made to the mixture. A suitable alternative silane material may comprise bis-(gamma-trimethoxysilpropyl) amine.

The plastic polymer-based layer may further comprise from 1 to 15% vol of a dry lubricant particulate, and a preferred range of 2 to 8% vol.

A dry lubricant particulate may be included in the plastic polymer-based layer for its beneficial effect on material frictional properties and its self-lubricating effect. The dry Lubricant particulate may be fluoropolymer, $Mo_2S$, or graphene. The fluoropolymer particulate addition may preferably be constituted by polytetrafluoroethylene (PTFE), as this is the most effective of the fluoropolymers in terms of reducing the friction coefficient and improving the self-lubricating properties of the plastic polymer-based layer. However, other suitable fluoropolymers, such as fluorinated ethylene-propylene (FEP), may be used if desired.

Below 1% vol of the dry lubricant particulate, the improvement in wear resistance and tribological properties is not significant. Above 15% vol of the dry lubricant particulate, the structural integrity of the plastic polymer-based layer may be compromised. Too high a content of dry lubricant particulate reduces the matrix hardness and strength by an unacceptable degree.

Particle size of the dry lubricant particulate desirably lies in the range from 1 to 5 μm, and a size range of 2 to 4 μm is preferred.

The plastic polymer-based layer may further comprise from 1% vol to less than 15% vol of a metal powder. Advantageously, the metal powder (particularly in the form of metallic flakes) enhances the thermal conductivity of the plastic polymer-based layer. The metal powder may further enhance the wear resistance of the plastic polymer-based layer. Below 1% vol of the metal powder, the improvement in wear resistance and tribological properties are not significant. Above 15% vol of the metal powder, the structural integrity of the plastic polymer-based layer may be compromised. In a preferred embodiment of the plastic polymer-based layer of the present invention, the metal powder content may lie in the range from 2 to 25% vol, and more preferably from 5 to 15% vol.

The metal powder may be chosen from: aluminium, aluminium alloys, copper, copper alloys, silver, tungsten, stainless steel. We have found that pure aluminium powder on its own gives the best results. Aluminium powder having particles in the form of flake-like platelets of about 5 to 25 µm in size, and preferably 10 to 20 µm in size (along the maximal dimension), provides a particularly suitable form of metal powder addition. The flake-like nature of the powder generally results in the maximum area of metal powder being exposed to a co-operating shaft journal by virtue of the plane of the flakes orientating generally parallel to the bearing surface. The provision of flakes within the plastic polymer-based layer that are generally parallel to the bearing surface may be provided by spray deposition of the plastic polymer-based layer.

A further advantage of the platelet flake morphology of the aluminium powder is that the particles are more securely bonded to the matrix by virtue of the relatively large surface area of each individual particle, and thus resists aluminium particles becoming plucked from the matrix during engine operation.

Without wishing to be bound by any particular theory, it is believed that the alumina film formed on the surface of the aluminium flakes may provide enhanced wear resistance. It is believed that the alumina in the plastic polymer-based layer of the sliding engine component provides a very fine abrasive, which tends to polish the machining asperities on the surface of the cooperating member (e.g. shaft journal surface), rendering the shaft journal surface less abrasive to the plastic polymer-based layer, thus reducing the wear rate of the layer.

In particular, the plastic polymer-based layer may comprise a matrix of a polyamide/imide-based polymer, having distributed throughout the matrix: from 10 to 15% vol thermochromic material; from 5 to less than 25% vol of a metal particulate (e.g. metal powder and/or metal flakes); from 1 to 20% vol of a fluoropolymer, the balance being the polyamide/imide resin apart from incidental impurities. Further, the plastic polymer-based layer may comprise 12.5% vol Al, 5.7% vol PTFE particulate, 4.8% vol silane, <0.1% vol other components, and balance polyamide/imide, apart from incidental impurities. The plastic polymer-based layer may comprise at least 60% vol of plastic polymer-based matrix material (proportions are specified with respect to the content of the overlay layer after the polymer has been cured).

Figure 1B:
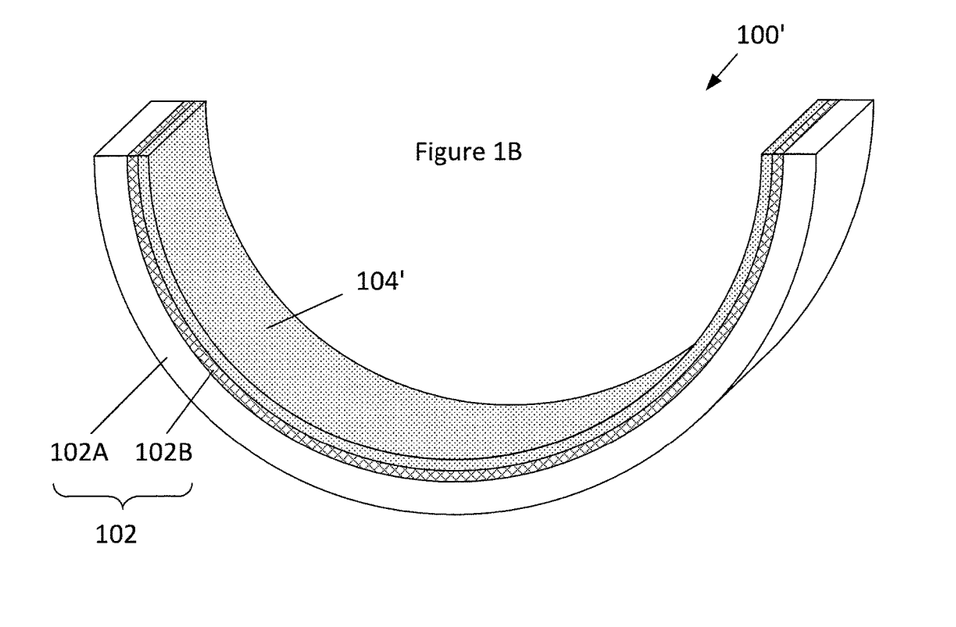
FIG. 1B shows the bearing shell of FIG. 1A after it has been cured above a first threshold thermal treatment condition.
Figure 1C:
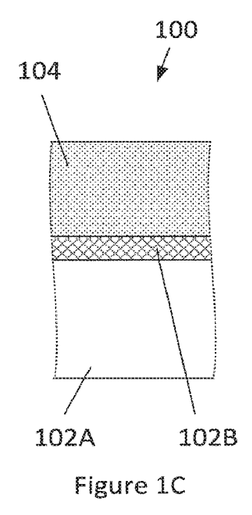
FIG. 1C shows a cross-sectional view through the bearing shell of FIG. 1A.

FIG. 1A shows the half bearing 100 after the overlay layer 104 has been deposited and the solvent has been dried out. In contrast, FIG. 1B shows the half bearing 100' of FIG. 1A after it has been thermally cured beyond the threshold thermal treatment condition of the thermochromic material in the plastic polymer-based overlay layer 104', which has undergone a corresponding colour change. FIG. 1C shows a cross-sectional view of the structure of the half bearing 100 of FIG. 1A.

The half bearing 100 has a lining layer 102B (e.g. an aluminium-tin based alloy lining layer) that is only able to withstand polymer curing at a lower temperature. Accordingly, the polymer-based overlay 104 comprises a thermochromic material having a relatively low colour-change threshold temperature. For example, for a half bearing that may be cured at about 160 to 200° C., curing may be indicated by the use of a thermochromic material having a slightly lower threshold temperature, such as $NiSO_4.7H_2O$, which can undergo an irreversible thermochromic change from light green to yellow when thermally treated above 155° C.

The thermal curing may be provided by baking in an oven or irradiating the half bearing with infrared radiation.

Accordingly, the sliding engine component has a plastic polymer-based layer on a metallic substrate, the polymer-based layer comprising: a matrix of plastic polymer-based material having distributed throughout the matrix a thermochromic material that changes colour irreversibly when thermally treated by heating beyond a threshold thermal treatment condition, and the thermochromic material may be in a thermally treated or thermally untreated state.

Figure 2A:
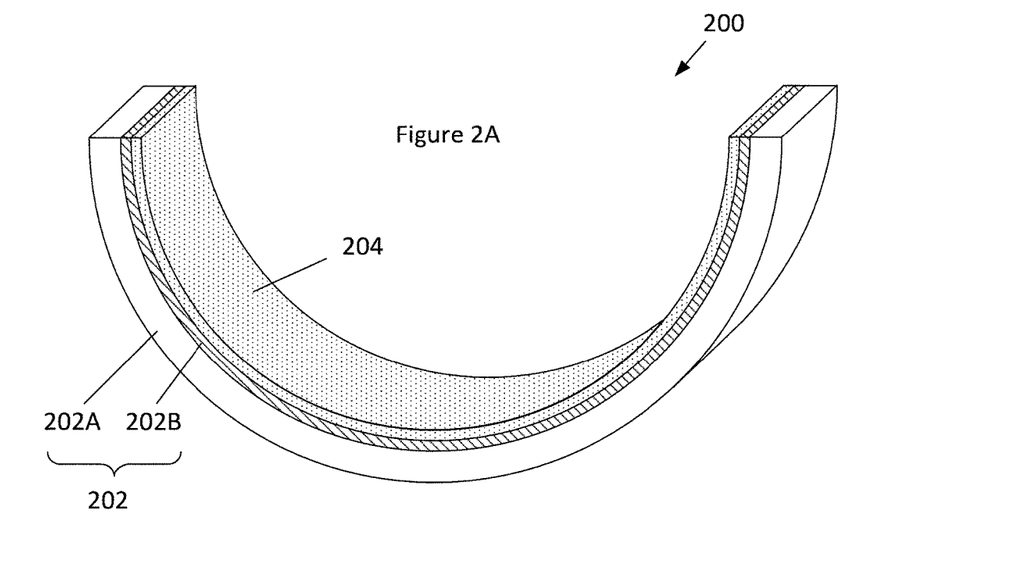
FIG. 2A shows a further bearing shell.
Figure 2B:
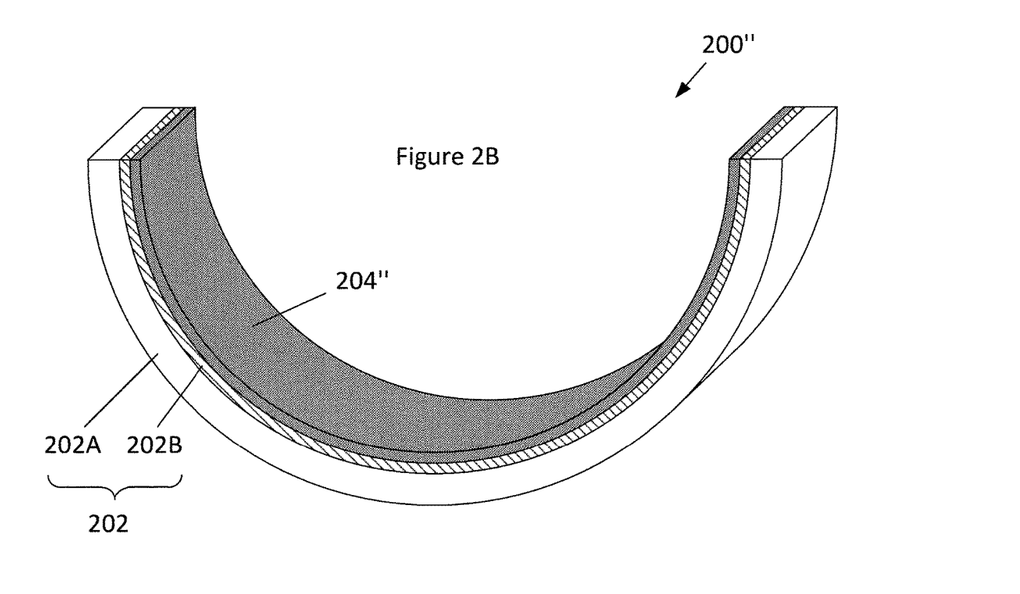
FIG. 2B shows the bearing shell of FIG. 2A after it has been cured above a second threshold thermal treatment condition (e.g. at a temperature that is higher than the temperature applied to the bearing of FIG. 1B)

FIG. 2A shows a half bearing 200 in which the plastic polymer-based overlay 204 has been deposited on a substrate 202 having a backing 202A and a lining layer 202B (e.g. a copper-tin bronze-based alloy lining layer) that is able to withstand exposure to a higher temperature, during polymer curing, than the lining layer 102B of the half bearing 100 in FIG. 1A. The polymer-based overlay 204 comprises a thermochromic material having a second threshold thermal treatment condition with a higher threshold temperature than the thermochromic material in the plastic polymer-based overlay 104 of FIG. 1A. FIG. 2B shows the half bearing 200" of FIG. 2A after the polymer-based overlay 204" has been cured above the second threshold thermal treatment condition (e.g. at a temperature that is higher than the temperature applied to the half bearing 100' of FIG. 1B). For example, for a half bearing 200" that may be cured at about 230 to 270° C., curing may be indicated by the use of a thermochromic material having a slightly lower threshold temperature, such as $[Co(NH_3)_4]PO_4$, which undergoes an irreversible thermochromic change from yellow to violet when thermally treated above approximately 210 to 220° C.

In an alternative embodiment, a plastic polymer-based overlay layer may comprise two thermochromic materials having different colour-change threshold thermal treatment conditions, and different colour-changes, to enable to distinguish between two different polymer curing regimes. For example, the solid powdered thermochromic materials $NiSO_4.7H_2O$ and $[Co(NH_3)_4]PO_4$ may both be dispersed in the polymer matrix to provide a difference in appearance between corresponding overlays that have been cured at 160 to 200° C. and those that have been cured at a temperature of 230° C. or above. Accordingly, after undergoing their respective thermal curing regimes, the half bearings may be visually distinguished by the different colours of the thermochromic materials in their overlay layers.

Figure 3:
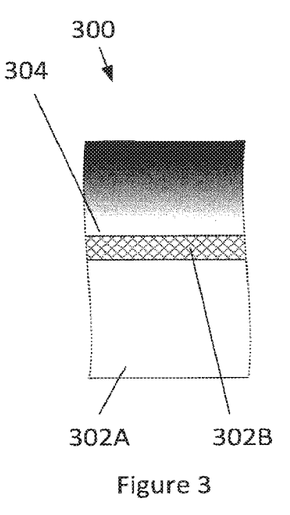
FIG. 3 and FIG. 4 show cross-sectional views through alternative bearing shells according to the present invention.

Although in FIGS. 1A to 2B, the plastic polymer-based overlay layer 104 has been shown as a single layer comprising thermochromic material that is homogeneously distributed throughout the layer, other arrangements are also possible. FIG. 3 illustrates an alternative plastic polymer-based layer 304, in which the density of thermochromic material is greater remote from the substrate (e.g. the backing 302A and/or the lining layer 302B) than proximate, e.g. having A density gradient of thermochromic material that increases away from the backing 302A.

By providing more of the thermochromic compound remote from the substrate (i.e. proximate the free surface of the half bearing 300), the visual appearance of the colour-change may be more pronounced and/or thermochromic material may be required. This is of particular benefit where the plastic polymer-based overlay comprises a significant proportion of other particulate, such as aluminium flakes, which may obscure the deeper regions of the overlay. Such a concentration gradient may be provided by varying the concentration of thermochromic material as the layer is deposited by spraying. Or, if deposited as a series of sub-layers, e.g. by screen printing, the successive sub-layers may be deposited with increasing proportions of pigmented particulate, or with pigment only in the final sub-layers.

Figure 4:
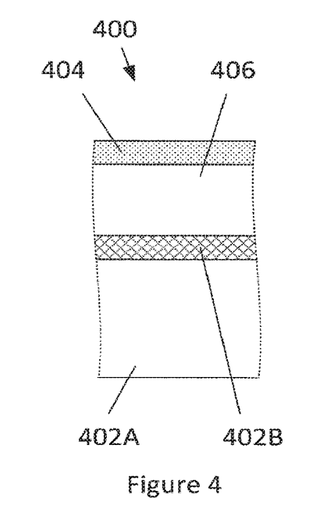

FIG. 4 illustrates a further alternative in which thermochromic material is provided in a plastic polymer-based overlay layer 404, but is not provided in a further plastic polymer-based layer 406 between that overlay layer 404 and the substrate 402A and 402B.

In the bearing 400 of FIG. 4, the uppermost layer 404 may be a thin running-in layer that is worn away relatively rapidly in use (i.e. a sacrificial layer), and which serves as a non-structural visual indicator (prior to use) of the thermal curing regime to which the underlying structural plastic polymer-based layer 406 has been exposed.

The plastic polymer-based material may be cured by heating in an oven or with infrared radiation. However, in a further embodiment, a plastic polymer-based material may be cured by a non-thermal process, for example being cured by exposure to ultraviolet light. Such a polymer curing process may be particularly suitable in the case that the (or a) thermochromic material used has a particularly low threshold thermal treatment condition (i.e. may be cured at a particularly low temperature).

The inclusion of a thermochromic material in accordance with the invention can enhance quality control during manufacturing. Use of a thermochromic material having a threshold thermal treatment condition that is lower than the thermal treatment condition for the polymer matrix enables a visual inspection (which may be a manual or automated visual inspection) to confirm whether a sliding engine component has been correctly cured. Use of a plurality of thermochromic materials having suitable threshold thermal treatment conditions can enable differentiation of components that have been manufactured with the same overlay and cured at different temperatures.

Further, the incorporation of thermochromic material into a bearing overlay may be useful as a diagnostic tool during the manufacturing development process of engine components, providing a direct indication of whether a certain temperature has been reached on a sliding engine component, in use under steady-running test conditions. Such information about operating temperatures within an operating engine can otherwise be difficult to obtain.

Yet further, the incorporation of thermochromic material may be useful to identify whether sliding engine components have been correctly cured during manufacturing or exposed to excess temperature during use.

In the case of a plastic polymer-based material having two or more thermochromic materials with different threshold thermal treatment conditions, manual or automated visual inspection may confirm under which temperature regime a bearing has been cured.

Although illustrated in FIGS. 1A, 1B, 2A and 2B in relation to a half bearing shell, the present invention equally applies to other sliding engine components, including semi-annular, annular or circular thrust washers, and bushes.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A sliding engine component, comprising:
   a sliding surface disposed on a metallic substrate;
   wherein the sliding surface is a cured plastic polymer-based layer comprising at least one thermochromic material and a non-thermochromic pigmented material distributed throughout a cured plastic polymer material;
   wherein each thermochromic material changes colour irreversibly when thermally activated by heating beyond a threshold thermal treatment condition;
   wherein the non-thermochromic pigmented material enhances a visual contrast of the cured plastic polymer-based layer when the at least one thermochromic material changes colour;
   wherein a total of all thermochromic materials occupy 5 to 20% vol of the cured plastic polymer-based layer; and wherein the non-thermochromic pigmented material occupies 5 to 20% vol of the cured plastic polymer-based layer.

2. A sliding engine component according to claim 1, wherein the cured plastic polymer-based layer comprises a single thermochromic material and is cured below the threshold thermal treatment condition of the thermochromic material.

3. A sliding engine component according to claim 1, wherein the cured plastic polymer-based layer comprises a single thermochromic material and is thermally cured above the threshold thermal treatment condition of the thermochromic material.

4. A sliding engine component according to claim 1, wherein the cured plastic polymer-based layer comprises a plurality of thermochromic materials, wherein each thermochromic material changes colour irreversibly at a different threshold thermal treatment condition.

5. A sliding engine component according to claim 4, wherein the cured plastic polymer-based layer is thermally cured above the threshold thermal treatment condition of at least two of said plurality of thermochromic materials.

6. A sliding engine component according to claim 1, wherein a total of all thermochromic materials occupy 10 to 15% vol of the cured plastic polymer-based layer.

7. A sliding engine component according to claim 1, wherein the at least one thermochromic material is present at a higher concentration at a surface of the cured plastic polymer-based layer remote from the metallic substrate than proximate to the metallic substrate, such that a density gradient of the at least one thermochromic material increases in a direction away from the metallic substrate and towards the surface.

8. A sliding engine component according to claim 1, further comprising a plastic polymer-based layer that does not contain a thermochromic material, which is disposed between the metallic substrate and the sliding surface.

9. A sliding engine component according to claim 1, wherein the at least one thermochromic material is selected from a group of thermochromic materials having at least one of:
a colour change based on a change in a crystalline phase;
a colour change based on a change in a ligand geometry; and
a colour change based on a change in a number of molecules of a solvent in a coordination sphere or to a decomposition.

10. A sliding engine component according to claim 1, wherein the at least one thermochromic material is in the form of a powdered solid particle dispersed in the cured plastic polymer material.

11. A sliding engine component according to claim 1, wherein the at least one thermochromic material is in the form of a solute dissolved in the cured plastic polymer material.

12. A sliding engine component according to claim 1, wherein the at least one thermochromic material includes at least one of: an inorganic metal salt, an organic encapsulated inorganic material, an acrylic polymer, and a leuco dye.

13. A sliding engine component according to claim 12, wherein the at least one thermochromic material includes at least one material selected from the group consisting of:
$Co(NO_2)_2$—$2C_5H_{12}N_4 \cdot 10H_2O$,
$[Co(NH_3)_5Cl]C_{12}$,
$[Co(NH_3)Cl]SiF_6$,
$[Co(NH_3)_6]PO_4$,
$NiSO_4 \cdot 7H_2O$,
$NiCl_2 \cdot 2C_6H_{12}N_4 \cdot 10H_2O$,
$NiBr_2 \cdot 2C_5H_{12}N_4 \cdot 10H_2O$,
$Ni(CNS)_2 \cdot pyridine$
$Ni(MoO_4)_6 \cdot 8H_2O$,
$Cu(OH)_2$,
$2Cu(CNS)_2 \cdot 2pyridine$,
$[Cr(NH_3)_6]_4(P_3O_7)_8$,
$(NH_4)_2Cr_2O_7$,
$Cd(OH)_2$,
$NH_4VO_3$,
$(NH_4)_2U_2O_7$, and
$NH_4CoPO_4$.

14. A sliding engine component according to claim 1, wherein the at least one thermochromic material is a leuco dye including at least one of: a spirolactone, a spiropyran, and a fulgide.

15. A sliding engine component according to claim 14, wherein the spirolactone is crystal violet lactone.

16. A sliding engine component according to claim 1, wherein the at least one thermochromic material includes a fluorone selected from the group consisting of:

3,3'-dimethoxy-fluorone,
3-chloro-6-phenylamino-fluorone,
3-diethylamino-6-methyl-7-chlorofluorone,
3-diethyl-7,8-benzofluorone,
3,3',3''-tris(p-di-methylaminophenyl)phthalide,
3,3'-bis(p-dimethyl-aminophenyl)-7-phenylaminofluorone, and
3-diethyl-amino-6-methyl-7-phenylamino-fluorone.

17. A sliding engine component according to claim 1, wherein the threshold thermal treatment condition of the at least one thermochromic material corresponds to a curing temperature in the range of 150 to 320° C.

18. A sliding engine component according to claim 1, wherein the sliding engine component is a sliding bearing assembly component selected from the group consisting of bearing lining shells, bushes, bearing surfaces of crankshafts, bearing surfaces of camshafts, bearing surfaces of connecting rods, thrust washers, bearing surfaces of a bearing block, and bearing surfaces of a bearing cap.

19. A sliding engine component according to claim 1, wherein the at least one thermochromic material has changed colour irreversibly by thermal activation beyond the threshold thermal treatment condition of the at least one thermochromic material.

20. A method of manufacturing a sliding engine component, comprising:
providing a metallic substrate;
coating the metallic substrate with a plastic polymer-based material to form a plastic polymer-based layer on the metallic substrate, and
curing the plastic polymer-based layer to form a cured plastic polymer-based layer, which is a sliding surface;
wherein the plastic polymer-based material and resulting layer comprises at least one thermochromic material and a non-thermochromic pigmented material distributed throughout a plastic polymer material;
wherein each thermochromic material changes colour irreversibly when thermally activated by heating beyond a threshold thermal treatment condition;
wherein the non-thermochromic pigmented material enhances a visual contrast of the cured plastic polymer-based layer when the at least one thermochromic material changes colour;
wherein a total of all thermochromic materials occupy 5 to 20% vol of the cured plastic polymer-based layer; and wherein the non-thermochromic pigmented material occupies 5 to 20% vol of the cured plastic polymer-based layer.

21. A method according to claim 20, wherein curing the plastic polymer-based layer comprises at least one of:
thermally curing the plastic polymer-based layer beyond the threshold thermal treatment condition of the at least one thermochromic material; and
curing the plastic polymer-based layer with at least one of a heat treatment process in an oven, an infrared radiation treatment, and an ultraviolet light treatment.

22. A method according to claim 20, further comprising analyzing the cured plastic polymer-based layer to identify an occurrence of a colour change indicative of heating beyond the threshold thermal treatment condition of the at least one thermochromic material.

23. A method according to claim 20, wherein coating the metallic substrate results in a plastic polymer-based layer wherein the at least one thermochromic material is present at a higher concentration at a surface of the plastic polymer-based layer remote from the metallic substrate than proximate to the metallic substrate, such that a density gradient of the at least one thermochromic material increases in a direction away from the metallic substrate and towards the surface.

* * * * *